United States Patent
Rhee

(10) Patent No.: US 9,568,299 B2
(45) Date of Patent: Feb. 14, 2017

(54) TOOL FOR USE WITH A TWO PIECE GROMMET

(71) Applicant: Toyota Motor Engineering & Manufacturing North America, Inc., Erlanger, KY (US)

(72) Inventor: Que-Whang Rhee, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 137 days.

(21) Appl. No.: 14/689,943

(22) Filed: Apr. 17, 2015

(65) Prior Publication Data

US 2016/0305757 A1    Oct. 20, 2016

(51) Int. Cl.
  *G01B 5/20* (2006.01)
  *A47G 27/00* (2006.01)
  *B60N 3/04* (2006.01)

(52) U.S. Cl.
  CPC ............. *G01B 5/20* (2013.01); *A47G 27/00* (2013.01); *B60N 3/046* (2013.01)

(58) Field of Classification Search
  CPC ............. F16B 5/02; H02G 3/08; H02G 3/18
  USPC .................................. 33/555.1, 613, 644
  See application file for complete search history.

(56) References Cited

U.S. PATENT DOCUMENTS

| | | | |
|---|---|---|---|
| 4,626,620 A * | 12/1986 | Plyler | H02G 3/083 174/153 G |
| 4,823,396 A | 4/1989 | Thompson | |
| 4,828,159 A | 5/1989 | Woods | |
| 5,012,592 A | 5/1991 | Greenslade | |
| 5,150,623 A | 9/1992 | Woods | |
| 5,727,300 A | 3/1998 | Ekdahl et al. | |
| 5,806,139 A * | 9/1998 | Anderson | B60R 16/0222 16/2.1 |
| 5,950,277 A * | 9/1999 | Tallmadge | F16B 5/0258 16/2.1 |
| 6,374,455 B1 * | 4/2002 | Regele | B08B 7/02 15/395 |
| 6,553,615 B1 * | 4/2003 | Hansen | F16B 5/0241 16/2.1 |
| 6,810,600 B1 | 11/2004 | Horwarth et al. | |
| 7,134,210 B2 | 11/2006 | Yeeles | |
| 7,152,307 B2 | 12/2006 | Swanberg et al. | |
| 7,244,894 B1 * | 7/2007 | Lipp | B60R 16/0222 16/2.1 |
| 7,555,818 B2 * | 7/2009 | Erskine | E04F 13/0835 24/305 |
| 8,022,328 B2 | 9/2011 | Scherer et al. | |

(Continued)

*Primary Examiner* — Yaritza Guadalupe-McCall
(74) *Attorney, Agent, or Firm* — Dinsmore & Shohl LLP

(57) ABSTRACT

A tool for determining if a two piece grommet is properly installed is provided. The tool includes a housing having a button. The button is movable from an up position to a down position. In the up position, indicia is displayed indicating that the grommet is not properly installed. In the down position, indicia is displayed indicating that the grommet is properly installed. The tool further includes a cup gauge and a stroke pin assembly. The cup gauge is dimensioned to fittingly engage the cup. The stroke pin assembly includes a stroke pin and a movable support. The button rests the movable support. The actuation of a stroke pin displaces the movable part away from the button, allowing the button to fall to the down position.

15 Claims, 7 Drawing Sheets

(56) References Cited

U.S. PATENT DOCUMENTS

| | | |
|---|---|---|
| 8,917,320 B2 | 12/2014 | Beauchemin |
| 8,991,006 B2 * | 3/2015 | Masanek, Jr. .......... B60N 3/044 16/21 |
| 2007/0068702 A1 * | 3/2007 | Fuller ...................... H02G 3/22 174/668 |

* cited by examiner

TOOL FOR USE WITH A TWO PIECE GROMMET

TECHNICAL FIELD

A tool configured to determine if a two piece grommet is properly installed is provided.

BACKGROUND OF THE INVENTION

Grommets are currently known and used with sheets of fabric such as carpet. Grommets may be configured to include a structure for which another article may be attached. The grommet has a first piece and a second piece. The first and second pieces are fitted together pinching the carpet therebetween. Such a grommet may be assembled and attached to a carpet of an automotive vehicle as shown in FIG. 1. The grommet includes a cup formed by the snap fitment engagement of the first piece to the second piece.

During installation of the carpet, the grommets are mounted to the carpet such that the first piece is fitted through an opening from the underside of the carpet and the top piece is mounted on top of the first piece and snapped together. The carpet is then installed onto the vehicle, thus hiding the cup from view. Accordingly, it may be difficult to determine if the grommet has been installed properly.

Accordingly, it remains desirable to have a tool which provides a visual notification that the respective tabs are fully engaged with a respective seating surface of the flanges.

SUMMARY OF THE INVENTION

A tool for determining if a two piece grommet is properly installed is provided. The two piece grommet includes a first piece configured to engage a second piece so as to secure the grommet to a piece of carpet. The grommet includes a cup. The cup is formed by the tabs of the second piece engaged with the seating surfaces of respective flanges of the first piece. The cup has a predetermined dimension when the second piece and the first piece are properly engaged.

The tool includes a housing having a top surface, a bottom surface, and an opening. The opening is disposed on the top surface. A button is slidably disposed within the opening. The tool further includes a cup gauge dimensioned to fittingly engage the cup. The button is configured to move between an up position and a down position. In the up position the button protrudes from the opening. In the down position the button is disposed within the opening.

The tool further includes a stroke pin assembly having at least two stroke pins. Each of the stroke pins is operatively attached to a movable support. A first biasing member is operatively attached to each stroke pin so as to maintain the stroke pin in first position. In the first position, the movable support is raised, keeping the button in the up position.

The stroke pins are actuated when the gauge is fittingly received within the cup wherein actuation of the stroke pin overcomes the respective first biasing member and displaces the movable support away from the button. Gravity is free to urge the button downwardly. Accordingly, it should be appreciated that all of the stroke pins must be actuated to move the button from the up position to the down position. In other words, an individual movable support is sufficient to prevent the button from falling to the down position.

In operation, the cup gauge is pressed into the cup. In instances where the two piece grommet is properly installed, each stroke pin is actuated so as to move each respective movable support away from the button. Gravity is then free to urge the pin to the down position indicating that the two piece grommet is properly installed. However, in the event the two piece grommet is not properly installed, the cup gauge cannot physically fit fully into the cup, thus not all of the stroke pins are actuated. Accordingly, at least one stroke pin is maintained in the first position wherein the respective movable support continues to support the button in up position, indicating that the two piece grommet is not properly installed.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with reference numerals and in which:

DETAILED DESCRIPTION OF THE PREFERRED EMBODIMENTS

A tool for determining if a two piece grommet is properly installed is provided. The tool includes a housing having an opening disposed on the top surface. A button is slidably disposed within the opening. The button is movable from an up position to a down position. In the up position, indicia is displayed indicating that the grommet is not properly installed. In the down position, indicia is displayed indicating that the grommet is properly installed.

The tool further includes a cup gauge and a stroke pin assembly. The cup gauge is dimensioned to fittingly engage the cup. The stroke pin assembly includes at least one stroke pin and a corresponding number of movable supports. The stroke pins are adjacent the cup gauge. The button rests one each of the movable supports. The actuation of a stroke pin displaces the movable part away from the button. The stroke pins are actuated by being pressed against the outer surface of a base of the grommet. The base is concentric to the cup. Thus, in instances where the two piece grommet is not properly installed, the cup gauge cannot fully fit into the cup and at least one of the stroke pins cannot be actuated. Accordingly, the button remains in the up position indicating that the two piece grommet is not properly installed. Further, the tool provides a visual indication that the two pieces of the grommet are properly fitted together.

Figure 2:
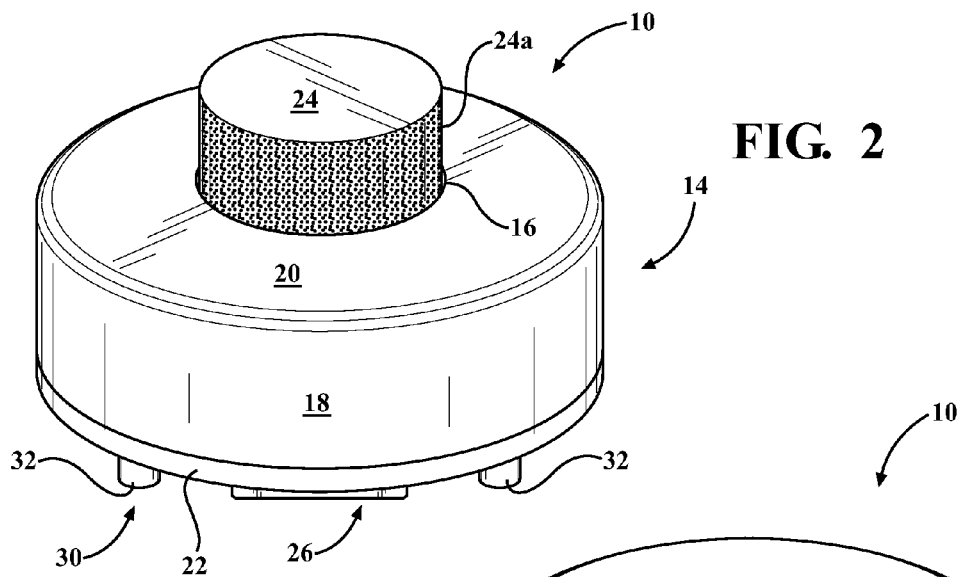
FIG. 2 is a perspective view of the tool showing the button in the up position
Figure 3:
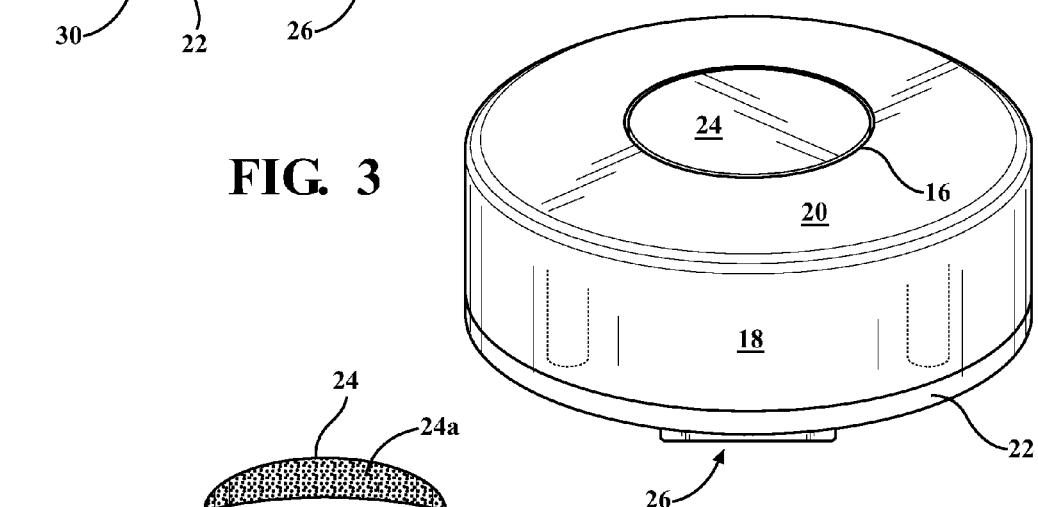
FIG. 3 is a perspective view of FIG. 2 showing the button in the down position.
Figure 4:
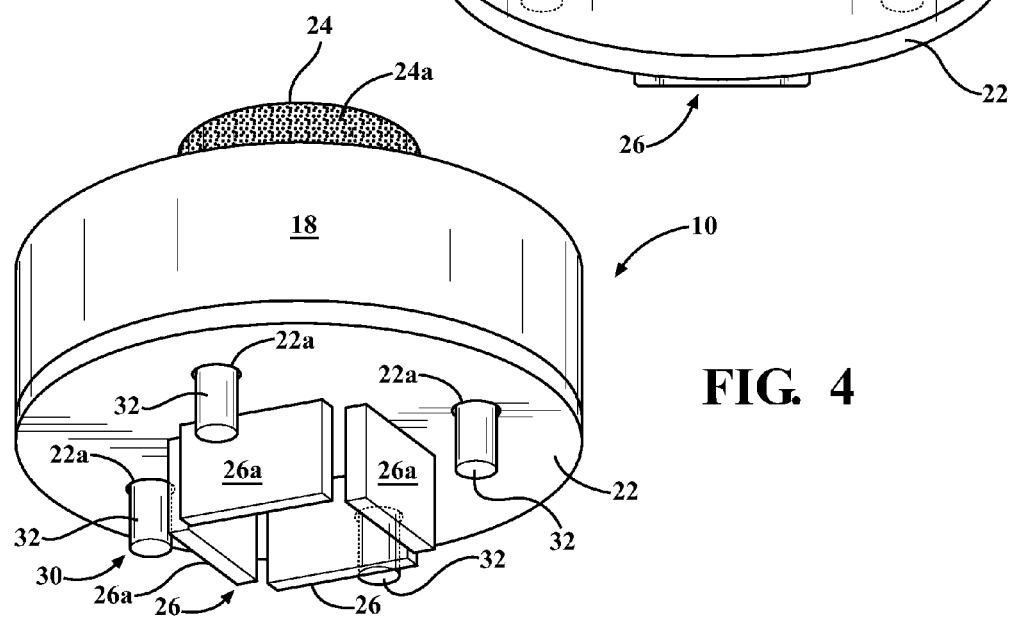
FIG. 4 is a view of the tool in FIG. 2 taken from the bottom.

With reference first to FIGS. 2-4, an illustrative embodiment of the tool 10 is provided. The tool 10 provides visual indication that the two piece grommet 12 is properly installed. The tool 10 includes a housing 14 having a central opening 16. The housing 14 includes a first wall 18, a top wall 20 and a plate 22. The central opening 16 is disposed on the top wall 20. The plate 22 includes a plurality of holes 22a. The housing 14 and the plate 22 may be formed of a material suitable for the injection molding process, or material suitable for stamping.

A button 24 is disposed within the central opening 16. FIG. 2 shows the button 24 in the up position and FIG. 3 shows the button 24 in the down position. The button 24 provides visual indication that the grommet 12 is properly installed.

In one embodiment, the first wall 18 of the housing 14 is colored green. The peripheral wall 24a of the button 24 may be colored so as to distinguish itself from the housing 14. For instance, the peripheral wall 24a may be colored red and the housing 14 may be colored green. The top surface 24b of the button 24 may also be colored green. Thus, it should be apparent that when the button 24 is in the up position red indicia is seen indicating that the two piece grommet 12 is improperly installed. With respect to FIG. 2, the button 24 is disposed within the central opening 16 and the green indicia on the top surface 24b matches the color of the housing 14 indicating that the grommet 12 is properly installed.

With reference now to FIG. 4, the tool 10 further includes a cup gauge 26. The cup gauge 26 is fixedly mounted to the underside of the plate 22. The cup gauge 26 is dimensioned to fittingly engage the cup 28 of the two piece grommet 12. The cup gauge 26 includes at least one pair of side walls 26a spaced apart from each other a predetermined distance commensurate with the distance between opposing surfaces of the cup 28. For illustrative purposes, the cup gauge 26 is shown having four side walls 26a. The side walls 26a are distanced from each other so as to be fittingly inserted into the cup 28 of a properly installed two piece grommet 12. The side walls 26a are preferably formed of a rigid and durable material so as to maintain a predetermined dimension.

The tool 10 further includes a stroke pin assembly 30. The stroke pin assembly 30 is operatively connected to the button 24 and configured to move the button 24 from an up position to a down position wherein in the up position the button 24 protrudes from the central opening 16 and in the down position the button 24 falls into the central opening 16.

The stroke pin assembly 30 includes a stroke pin 32. A portion of the stroke pin 32 extends through a hole 22a of the plate 22. For illustrative purposes, the stroke pin assembly 30 is shown having four stroke pins 32. Each stroke pin 32 is disposed within a respective hole 22a of the plate 22. However, it should be appreciated that the tool 10 may be configured to have one or more stroke pins 32 based upon the physical dimensions of the cup 28.

The stroke pin 32 is movable from first position wherein the stroke pin 32 extends outwardly from a bottom surface of the plate 22 to a second position where the stroke pin 32 may be driven up into the inner space of the housing 14. The stroke pins 32 are adjacent to a respective side wall 26a so as to determine if a respective side wall 26a is fully engaged within the cup 28.

Figure 5:
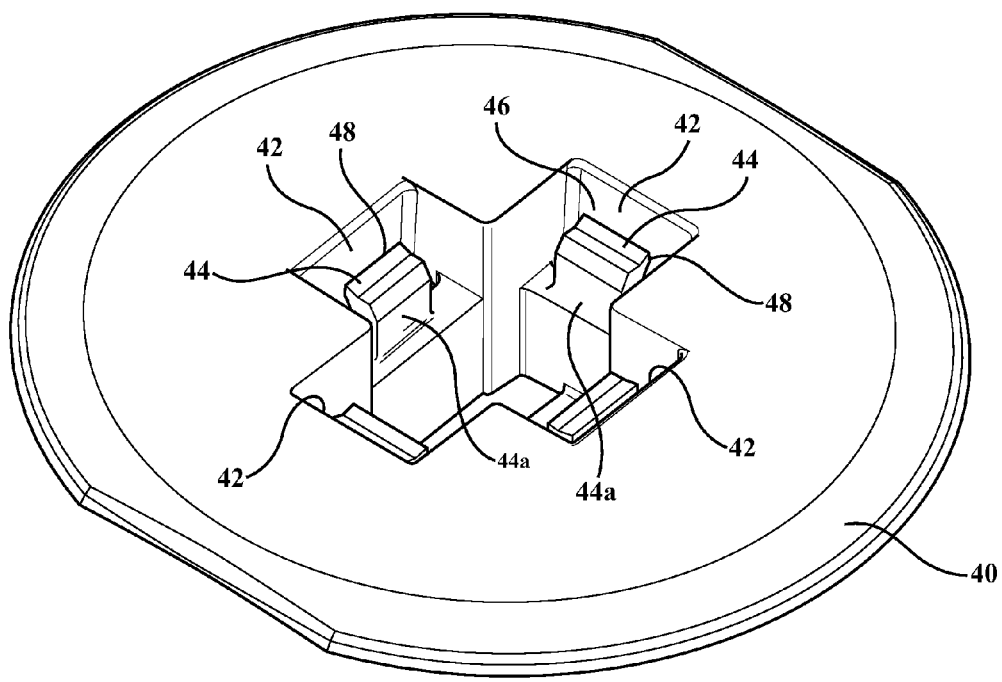
FIG. 5 is an illustrative embodiment of the second piece of a two piece grommet.
Figure 6:
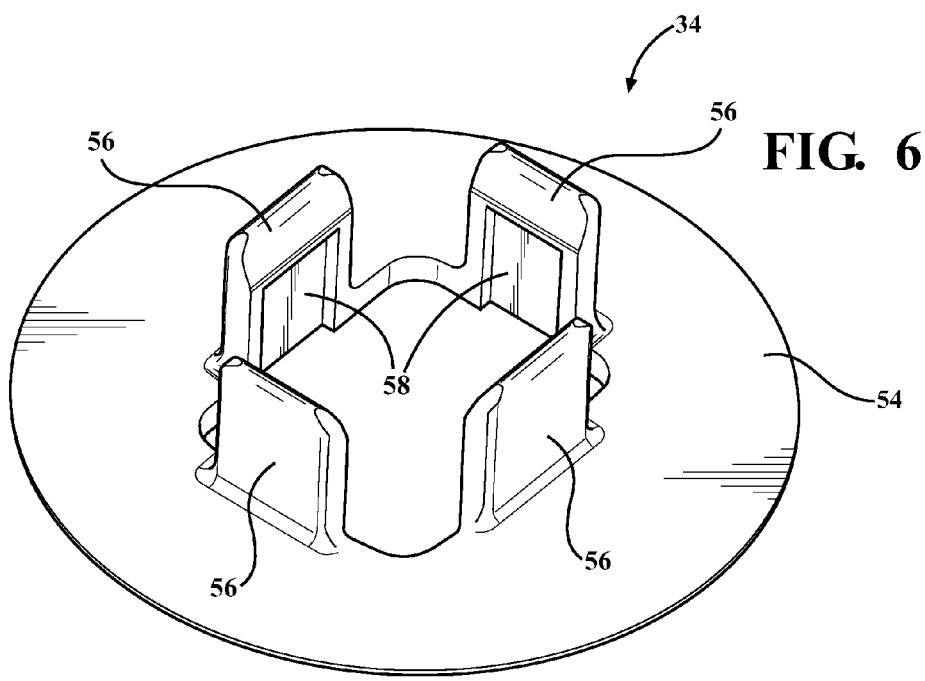
FIG. 6 is an illustrative embodiment of the first piece of a two piece grommet.

With reference now to FIGS. 5 and 6, an illustrative view of a first piece 34 and a second piece 36 of a two piece grommet 12 is provided. The two piece grommet 12 may be mounted to a carpet 200 of a vehicle 210 and includes an attachment feature 38 configured to secure a floor mat 220 in a fixed position relative to the carpet 200.

With reference first to FIG. 5, a view of the second piece 36 of the grommet 12 taken from the bottom is provided. The attachment feature 38 is disposed on a top surface of the second piece 36. The second piece 36 includes a second base 40 and a plurality of guide walls 42. The second base 40 is disposed on top of the carpet 200 when the two piece grommet 12 is assembled thereto. The second base 40 is generally annular and concentric to the guide walls 42. The second piece 36 further includes a plurality of tabs 44 spaced apart from a respective guide wall 42 so as to define a guide slot 46. The guide walls 42 are a generally elongated planar member as are the tabs 44 so as to define an elongated guide slot 46. Each tab 44 includes an engagement feature 48. The engagement feature 48 is illustratively shown as a wedge. The tabs 44 have a back wall 44a which define the shape of the cup 28. The second piece 36 may be formed of a durable and resilient material suitable for injection molding or blow molding.

FIG. 6 is an illustrative view of the first piece 34 of the two piece grommet 12 taken from the top. The first piece 34 is configured to sit underneath the carpet 200 and includes a first base 54 and a plurality of flanges 56. The first base 54 is generally annular and concentric to the plurality of flanges 56. The flanges 56 are configured to slidingly fit within a respective guide slot 46. The flanges 56 are generally elongated planar members and each include a seating surface 58 configured to receive an engagement feature 48 of a respective tab 44.

Figure 1:
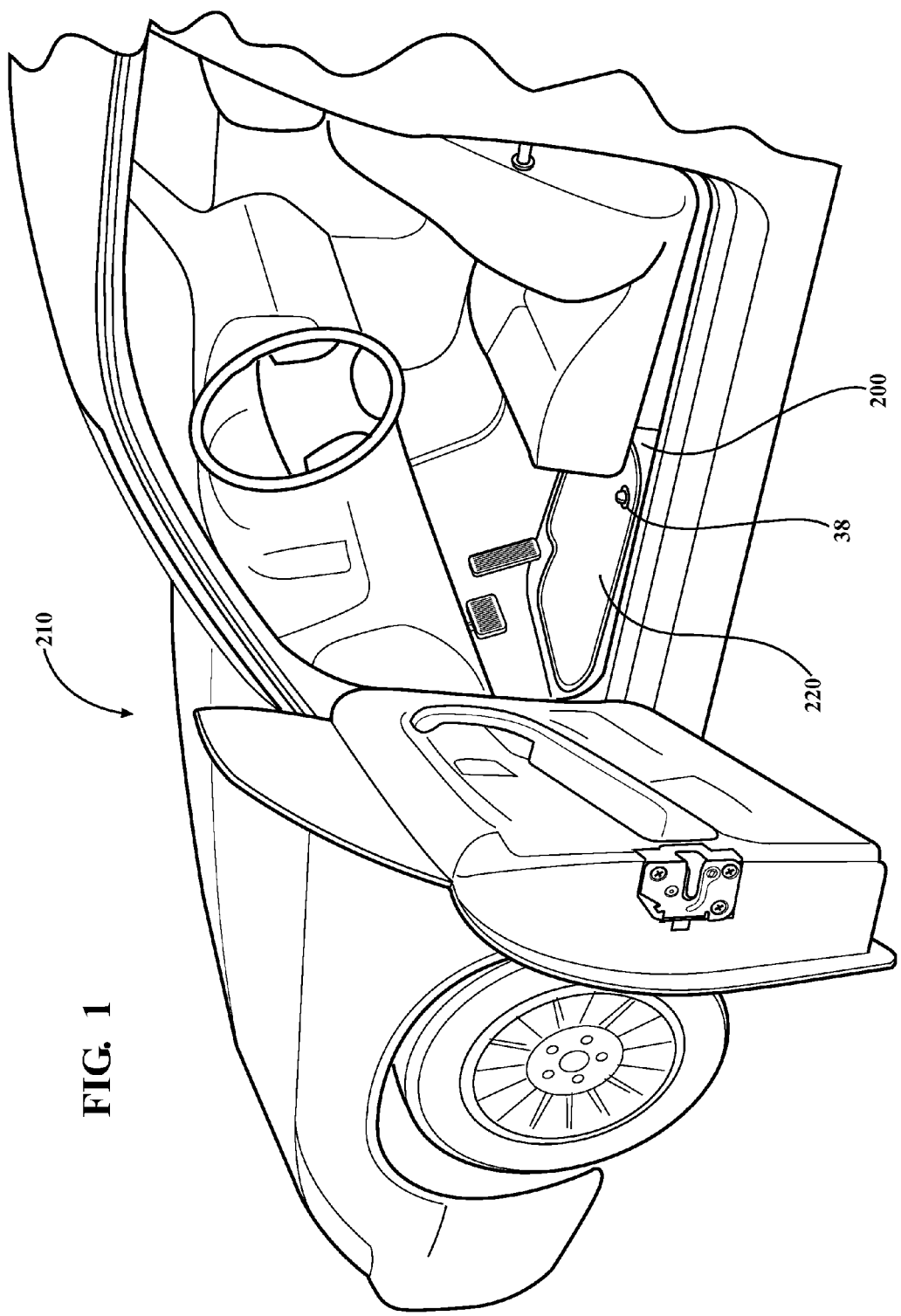
FIG. 1 is a perspective view showing a floor mat mounted to a carpet.
Figure 7:
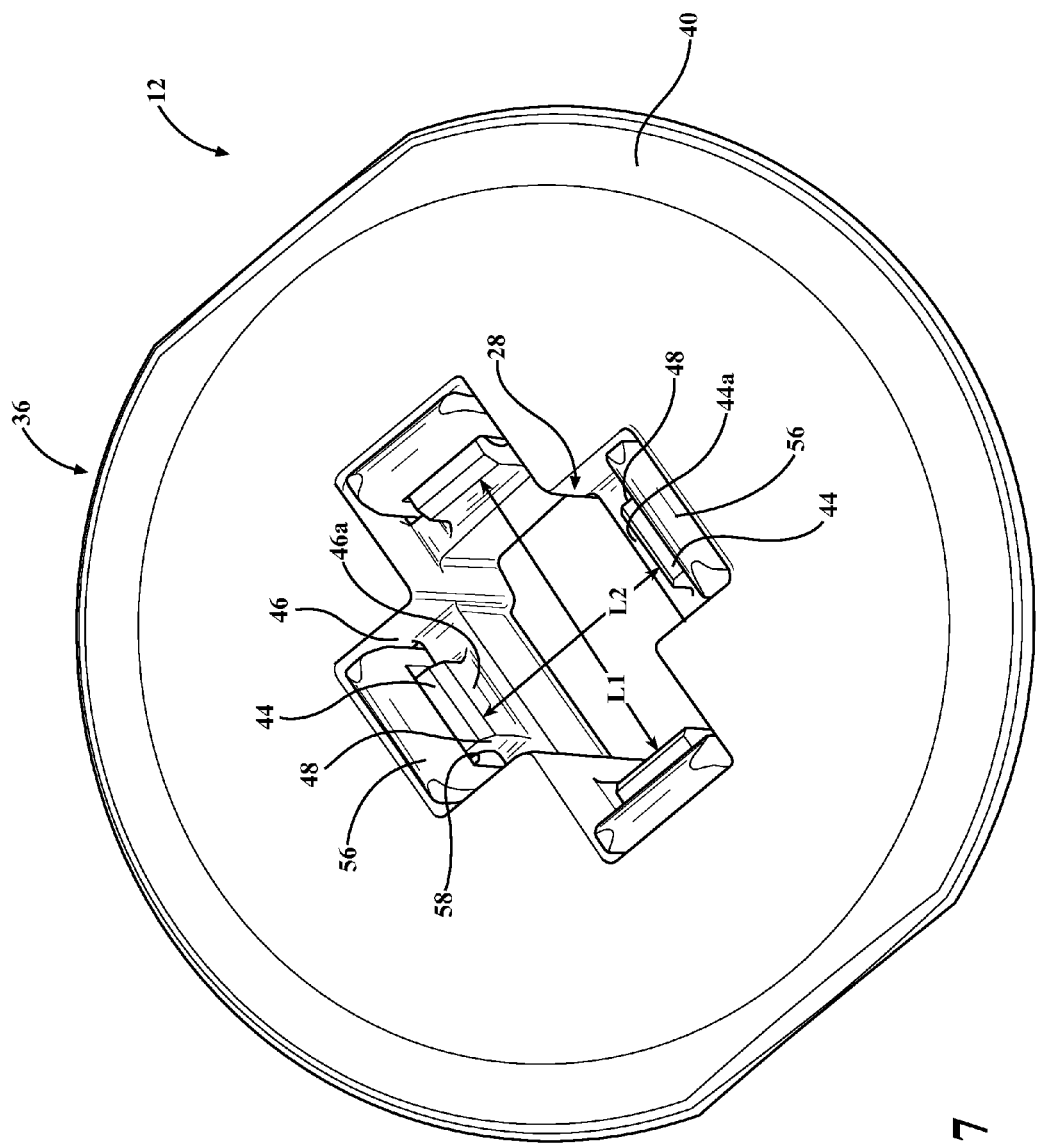
FIG. 7 is a view of the two piece grommet assembled taken from the bottom.

With reference now to FIG. 7, an illustration showing the first piece 34 and the second piece 36 properly engaged with each other is provided. FIG. 4 is a view taken from the bottom of the two piece grommet 12 so as to show the cup 28. The first piece 34 and the second piece 36 are fitted together in a snap fit engagement, wherein the flanges 56 are slid into respective guide slots 46. The first and second pieces 34, 36 are pressed together so as to fit the wedge 48 into the seating surface 58 of a respective flange 56. The second piece 36 is mounted onto the first piece 34 in a snap fit engagement, pinching the carpet 200 therebetween. The second piece 36 is disposed above the outer surface of the carpet 200. The attachment feature 38 is shown as a swiveled tab. The swiveled tab 38 is configured to engage an opening of the floor mat 220 so as to secure the floor mat to the carpet 200, as shown in FIG. 1.

The cup 28 is defined by the back walls 44a of the tabs 44. The lines $L_1$, $L_2$ indicate a predetermined distance between opposing tabs 44 that are properly engaged with a respective flange 56. Accordingly, it should be appreciated that the cup 28 has a predetermined dimension when the first piece 34 is properly installed in the second piece 36. It should also be understood that the distance between opposing tabs 44 will be shortened in instances where one tab 44 is not fully seated into a seating surface 58 of a respective flange 56.

Figure 8:
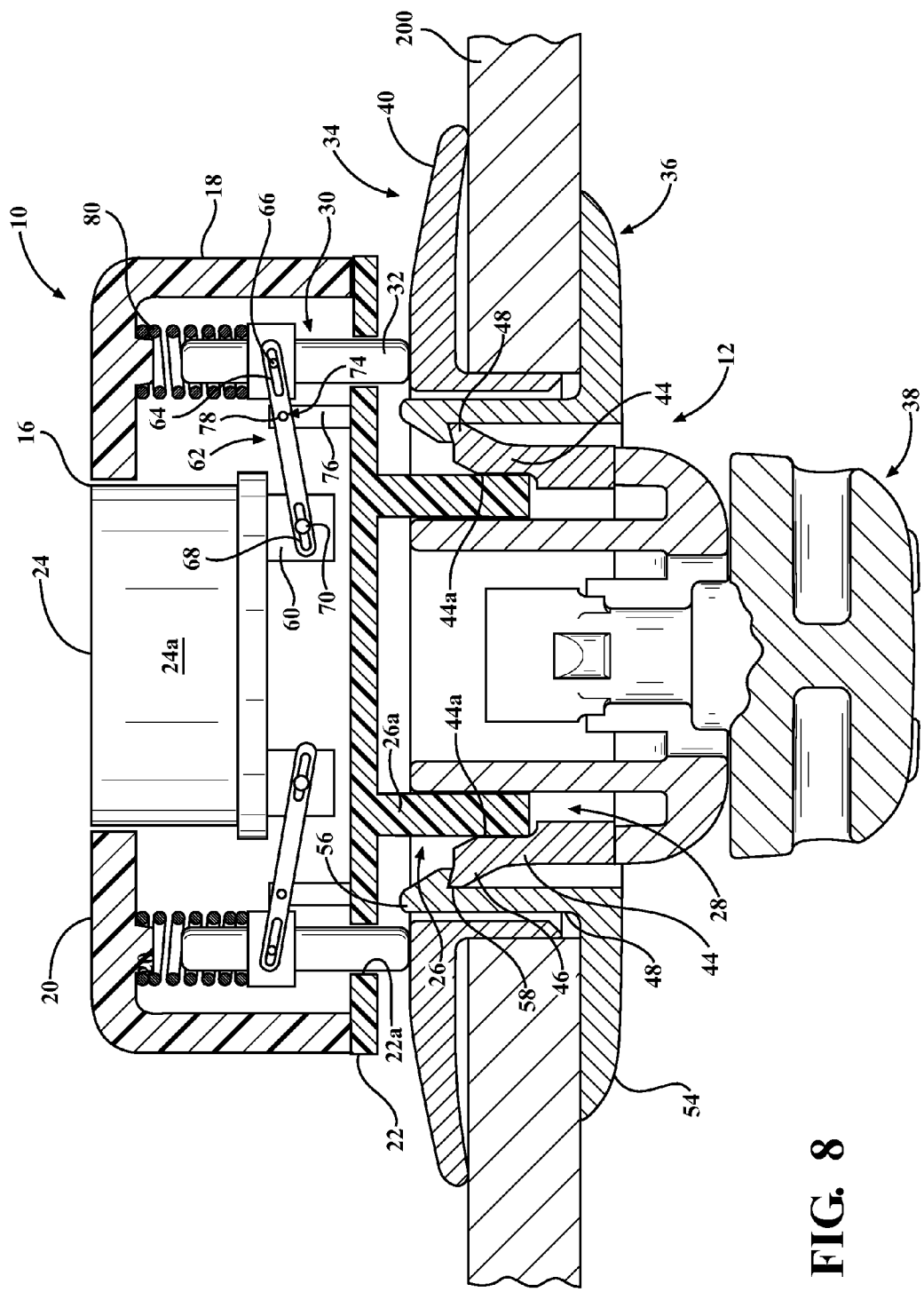
FIG. 8 is a cross-sectional view of the tool engaged with a properly assembled two piece grommet.

With reference now to FIG. 8, a cross-sectional view showing the tool 10 in use with the two piece grommet 12 is provided. FIG. 8, depicts the stroke pin assembly 30 show in FIGS. 5-7. Each stroke pin 32 is operatively connected to the button 24 and each stroke pin 32 is configured to maintain the button 24 in the up position when the stroke pin 32 is in the first position. When a particular stroke pin 32 is actuated, the stroke pin 32 is configured to disengage the button 24. The button 24 will not fall into the down position unless all stroke pins 32 are actuated. Accordingly, the tool 10 will not indicate that the two piece grommet 12 is properly installed unless the entire cup gauge 26 is fully seated within the cup 28.

With reference again to FIG. 8, the stroke pin assembly 30 may further include a movable support 60. The movable support 60 is shown as a block. The movable support 60 is disposed underneath the button 24 so as to prevent the button 24 from falling from the up position.

The stroke pin assembly 30 may further include a hinge arm 62 pivotably mounted to a respective stroke pin 32. One end of the hinge arm 62 includes a first pinhole 64. The first pinhole 64 is pivotably coupled to a respective stroke pin 32 by a first pivot pin 66. The other end of the hinge arm 62 includes a second pinhole 68. The second pinhole 68 and is engaged with a respective movable support 60 by a second pivot pin 70.

The hinge arm 62 further includes a third pinhole 72. The third pinhole 72 is pivotably mounted to a fixed pivot point 74. The fixed pivot point 74 is disposed on a pivot support 76 and a third pivot pin 78 pivotably engages the hinge arm 62 to the fixed pivot point 74. The first and second pinhole 68 are elongated slots so as to facilitate the translation of an axial movement of the stroke pin 32 with the axial movement of a respective movable support 60 about the fixed pivot point 74. It should be appreciated that the displacement of the button 24 may be engineered based upon the distance between the fixed pivot point 74 and the first pivot pin 66, the length of the hinge arm 62, and the length of the stroke pin 32. Accordingly, the stroke pin assembly 30 may be engineered to achieve a desired visual notification with respect to the length of the button 24. Specifically, the tool 10 may accommodate a button 24 having a predetermined height based upon the physical dimensions of the hinge arm 62, the length of the stroke pins 32, and the distance between the fixed pivot point 74 and the first pivot pin 66.

The stroke pin assembly 30 may further include a first biasing member 80 operatively engaged with a respective stroke pin 32. The first biasing member 80 is shown disposed between an inner surface of the housing 14 and a top portion of a respective stroke pin 32. The first biasing member 80 is configured to continuously urge the stroke pin 32 into the first position, wherein the movable support 60 is positioned to support the button 24 in the up position.

FIG. 8 shows opposing side walls 26a of the cup gauge 26 fittingly engaged within the cup 28, and thus opposing stroke pins 32 are actuated by being pressed against the second base 40 of second piece 36. Accordingly as all of the stroke pins 32 are actuated, the biasing force of the first biasing member 80 is overcome so as to place the stroke pins 32 in the second position. The stroke pins 32 push up one end of the hinge arm 62, causing the hinge arm 62 to pivot about the fixed pivot point 74. Accordingly the other end of the hinge arm 62 is lowered, thus lowering a respective movable support 60. As the button 24 rests upon the movable supports 60, the button 24 is free to move to the down position, indicating to the user that the two piece grommet 12 is properly installed.

Figure 9:
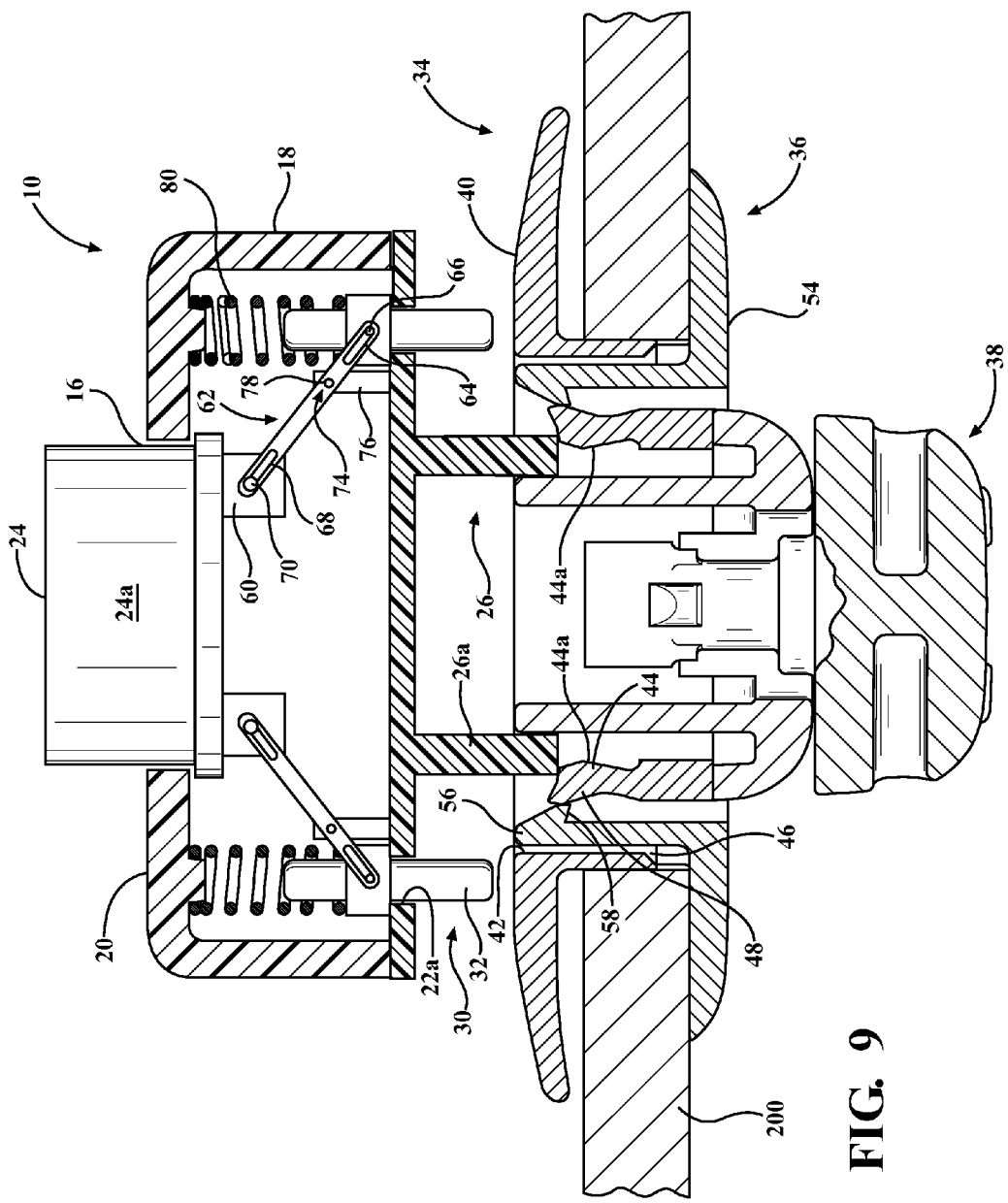
FIG. 9 is a cross-sectional view of the tool engaged with an improperly assembled two piece grommet.

With reference now to FIG. 9, a cross-sectional view of the tool 10 engaged with an improperly installed two piece grommet 12 is provided. FIG. 9 shows that opposing wedges 48 of the second piece 36 are not fully seated within the seating surface 58 of a respective flange 56. Accordingly, the side walls 26a of the cup gauge 26 cannot physically fit within the cup 28. Since the cup gauge 26 cannot fit within the cup 28 the stroke pins 32 are not actuated. The first biasing members 80 are free to continue to urge the corresponding stroke pins 32 into the first position. In the first position, the movable supports 60 maintain a position to support the button 24 in the up position.

Figure 10:
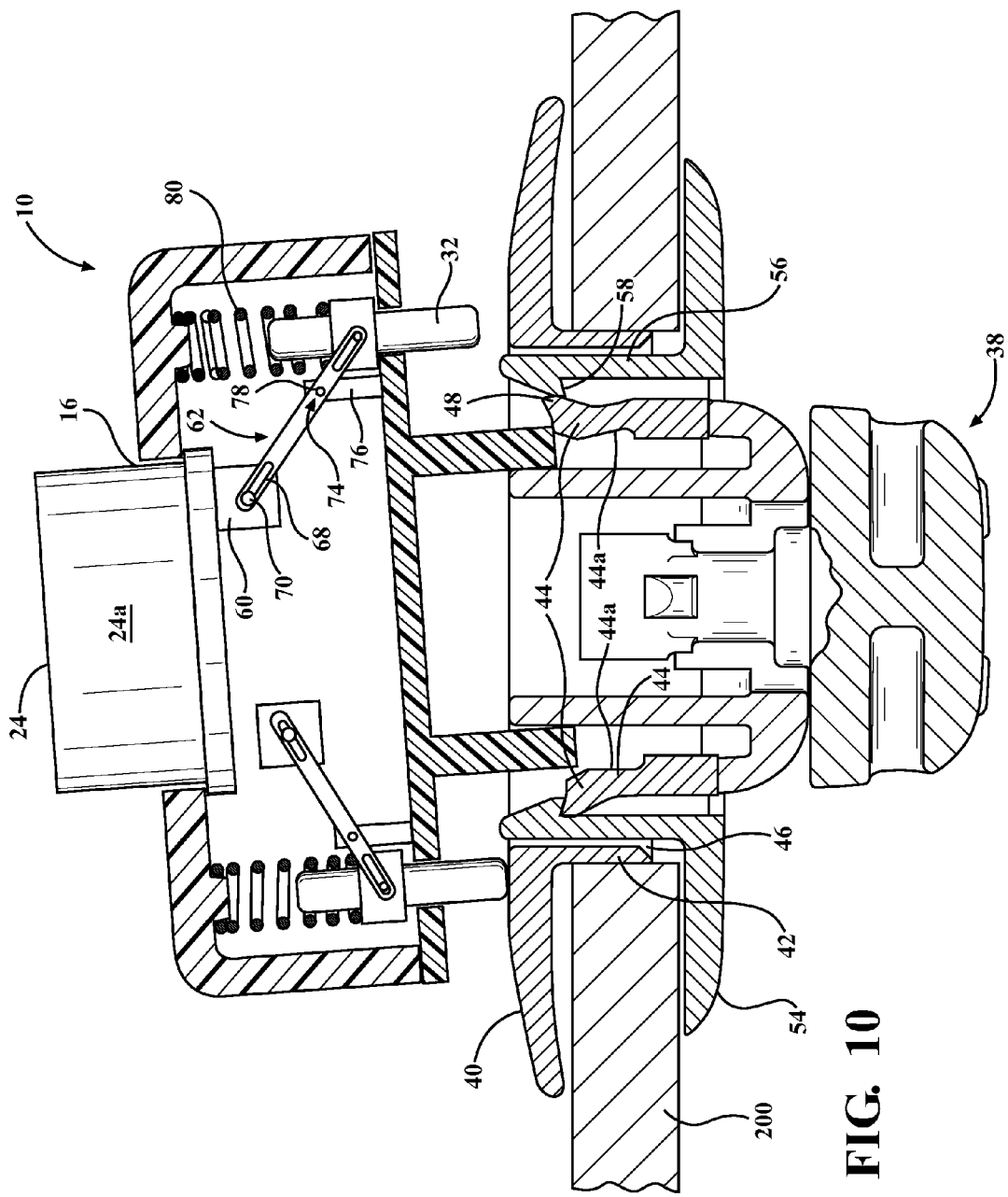
FIG. 10 is a cross-sectional view of the tool engaged with an improperly assembled two piece grommet.

With reference now to FIG. 10, another cross-sectional view of the tool 10 engaged with an improperly installed two piece grommet 12 is provided. FIG. 10 shows a situation where it may appear to the naked eye that the two piece grommet 12 is properly installed. As shown, one wedge 48 is not fully seated within its respective seating surface 58. Accordingly, the cup gauge 26 partially fits within the cup 28. Specifically, one of the side walls 26a of the cup gauge 26 is inserted far enough into the cup 28 so as to actuate the adjacent stroke pin 32, wherein the force of the first biasing member 80 is overcome and the stroke pin 32 is moved to the second position. In the second position, the movable support 60 is lowered and displaced away from the button 24. However, the other stroke pin 32 is not actuated and thus the first biasing member 80 is free to urge the stroke pin 32 into the first position wherein the corresponding movable block continues to support the button 24 in the up position.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

The invention claimed is:

1. A tool for determining if a two piece grommet is properly installed, the two piece grommet having a first piece configured to engage a second piece so as to form a cup having a base concentric to the cup, the tool comprising:
   a housing having a top surface, a bottom surface and an opening, the opening disposed on the top surface;
   a button disposed within the opening, the button movable between an up position and a down position, wherein in the up position the button protrudes from the opening, in the down position the button is disposed within the opening;
   a cup gauge dimensioned to fittingly engage the cup of a properly installed two piece grommet; and
   a stroke pin assembly operatively connected to the button and configured to support the button in an up position, the stroke pin assembly further configured to disengage the stroke pin from the button when actuated so as to allow the button to fall to the down position, the stroke pin assembly is actuated when the cup gauge is fittingly received within the cup indicating that the grommet is properly installed.

2. The tool as set forth in claim 1, wherein the stroke pin assembly includes at least two stroke pins extending through the bottom surface of the housing and adjacent the cup gauge.

3. The tool as set forth in claim 2 further including a hinge arm and a pivot support for each of the at least two stroke pins, the pivot support having a fixed pivot point, the hinge arm having a first end and a second, the second end of the hinge arm pivotally mounted to a respective at least two stroke pins, the first end of the hinge arm pivotally mounted to a moveable support, the movable support disposed beneath the button, the hinge arm pivotably mounted to the fixed pivot point.

4. The tool as set forth in claim 3, wherein the first end of the arm includes an elongated slot, and wherein the button includes a pin, the elongated slot engage with the pin.

5. The tool as set forth in claim 3, further including a first biasing member operatively connected to each of the at least two stroke pins so as to urge each of the at least two stroke pins into a first position, wherein the movable support is positioned to support the button in the up position.

6. The tool as set forth in claim 5, wherein the hinge arm is angled relative to the stroke pin when the stroke pin is in the first position.

7. The tool as set forth in claim 5, wherein the button includes an outer peripheral wall having indicia indicating that the two piece grommet is not properly installed so as to be displayed when the stroke pin is not actuated.

8. The tool as set forth in claim 1, wherein the gauge includes a pair of opposing side walls, the side walls spaced apart so as to slidingly engage opposing surfaces of the cup.

9. The tool set as set forth in claim 8, wherein one of the at least two stroke pins is disposed adjacent one of the side walls and the other of the of at least two stroke pins stroke pins is disposed adjacent the other side wall.

10. A tool for determining if a two piece grommet is properly installed, the two piece grommet having a first piece configured to engage a second piece so as to form a cup having a base concentric to the cup, the tool comprising:
   a housing having a top surface, a bottom surface and an opening, the opening disposed on the top surface;
   a button disposed within the opening, the button movable between an up position and a down position, wherein in the up position the button protrudes from the opening, in the down position the button is disposed within the opening;
   a cup gauge dimensioned to fittingly engage the cup of a properly installed two piece grommet; and
   a stroke pin assembly configured to move the button between an up and down position, the stroke pin assembly including at least two stroke pins, a hinge arm, and a movable support, each of the at least two stroke pins mounted to a first end of the hinge arm, the hinge arm pivotably mounted within the housing, a second end the hinge arm the stroke pin is mounted to the movable support, the button resting on the movable support, wherein actuation all of the at least two stroke pin displaces the movable support from the button so as to allow gravity to move the button from the up position to the down position.

11. The tool as set forth in claim 10, wherein the first end of the at least one hinge arm includes an elongated slot, and wherein the button includes a pin, the elongated slot engage with the pin.

12. The tool as set forth in claim 11, wherein the button includes an outer peripheral wall having indicia indicating that the two piece grommet is not properly installed so as to be displayed when the stroke pin is not actuated.

13. The tool as set forth in claim 11, wherein the gauge includes a pair of opposing side walls, the side walls spaced apart so as to slidingly engage opposing surfaces of the cup.

14. The tool set as set forth in claim 13, wherein one of the at least two stroke pins is disposed adjacent one of the side walls and the other of the at least two stroke pins is disposed adjacent the other side wall.

15. The tool as set forth in claim 10, further including a first biasing member operatively connected to each of the at least two strokes pin so as to urge each of the at least two stroke pins into a first position, wherein the movable support is positioned to support the button in the up position.

* * * * *